(12) United States Patent
Blockcolsky

(10) Patent No.: US 7,607,842 B2
(45) Date of Patent: Oct. 27, 2009

(54) METHOD OF REDUCING VIBRATION IN THE FINE MOVEMENT OF A PRECISION INSTRUMENT SECURED TO A TRIPOD

(76) Inventor: Brian Blockcolsky, 4511 Folker St., #25A, Anchorage, AK (US) 99507

( * ) Notice: Subject to any disclaimer, the term of this patent is extended or adjusted under 35 U.S.C. 154(b) by 449 days.

(21) Appl. No.: 11/451,279

(22) Filed: Jun. 12, 2006

(65) Prior Publication Data

US 2007/0286595 A1 Dec. 13, 2007

(51) Int. Cl.
*G03B 17/00* (2006.01)
(52) U.S. Cl. .................. 396/419; 396/420; 396/421; 396/423; 396/428
(58) Field of Classification Search .............. 396/419, 396/420, 421, 423, 428; 33/754, 768
See application file for complete search history.

(56) References Cited

U.S. PATENT DOCUMENTS

| | | | | |
|---|---|---|---|---|
| 1,766,090 A | * | 6/1930 | Worsching | .................. 396/421 |
| 5,007,178 A | * | 4/1991 | Dewire et al. | .................. 33/767 |
| 6,247,427 B1 | * | 6/2001 | DeBien | ....................... 119/776 |
| 6,752,369 B1 | * | 6/2004 | Cameron | ..................... 248/500 |
| 2005/0265711 A1 | * | 12/2005 | Heibel | ......................... 396/419 |
| 2006/0162675 A1 | * | 7/2006 | Ghalebi et al. | .............. 119/796 |

* cited by examiner

*Primary Examiner*—Christopher E Mahoney
*Assistant Examiner*—Michael A Strieb
(74) *Attorney, Agent, or Firm*—Michael J. Tavella

(57) ABSTRACT

A hand held device that is connected to a precision instrument's handle or eye piece to bridge the connection between the operator and the instrument. With the device connected, the invention allows the instrument's operator to finely control the instrument's movement. Allowing the adjustment of the instrument's shot by pulling on the device instead of the instrument's handle or eyepiece. Elastic resilient tape is used to smoothly guide the fine movements of an instrument and reduce unwanted vibrations caused by an operator's hands. Using the device by operators of precision instruments is a simple task. The device's small, light weight, and easy to operate design can be made in different sizes to accommodate the various sizes of precision instruments, like cameras, telescopes, and transits. Moreover, the device can be sold individually for a low price.

9 Claims, 13 Drawing Sheets

METHOD OF REDUCING VIBRATION IN THE FINE MOVEMENT OF A PRECISION INSTRUMENT SECURED TO A TRIPOD

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to a device for controlling the fine movement of delicate instruments such as cameras, telescopes, or surveying instruments mounted upon a base, and particularly to device for controlling the fine movement of delicate instruments utilizing a resilient retractable cord to effect such movement.

2. Description of the Prior Art

Previously, professional and amateur operators of instruments such as cameras, telescopes, and surveying instruments commonly used their hands to move and make fine adjustments to the instrument. Typically, these instruments are mounted on a base, such as a tripod. FIGS. 1A, 1B, 1C and 1D show prior art examples of an operator 105, operating cameras 102a (in FIG. 1a), 102b (in FIG. 1b), 102c (in FIG. 1c), and a telescope 106 using his hands 110. Making fine movements of an instrument by using the hands of the operator can cause unwanted vibrations and large overcompensated movements in the instrument. If the instrument is a camera, the video footage can have unwanted vibrations simply because the operator's hand rests on the tripod's handle in anticipation of a subject's movement. To compensate for the subject's potential movement, the professional videographer will often set the camera shot so that the subject has room to move within the camera frame. Otherwise, the videographer is forced to touch the camera and tripod in order to follow the subject. As mentioned above, this contact with the camera and tripod invariably causes unwanted vibrations in the video footage. Therefore, professional videographers are taught not to touch either unless the subject moves or until the videographer is ready to establish the next camera shot. Specifically, in the fields of cinema, video and television, these unwanted vibrations and jerky camera movements produce problems that persist into the editing studio. In the editing studio, the video editor has to creatively use editing tools to cover up these problems by either cutting out, freezing and slowing the image caught, or by changing the image and footage to produce an acceptable story for television. If there are no other camera images available then the viewers are forced to watch unsteady video, and the permanent record of the video images is of poor quality.

BRIEF DESCRIPTION OF THE INVENTION

The instant invention overcomes these problems. It is a device that connects between the operator and the instrument to calm vibrations down while the operator moves the camera, telescope, transit, or the like. The device is useful in that it lets the operator to move a precision instrument smoothly, thereby preventing rapid, jerky, or unintentional movements. The device utilizes elastic tape to absorb the vibrations caused by the human hand and use of the device decreases the time and efforts of a video editor to cover up the problem of unstable video.

DETAILED DESCRIPTION OF THE INVENTION

Figure 1A:
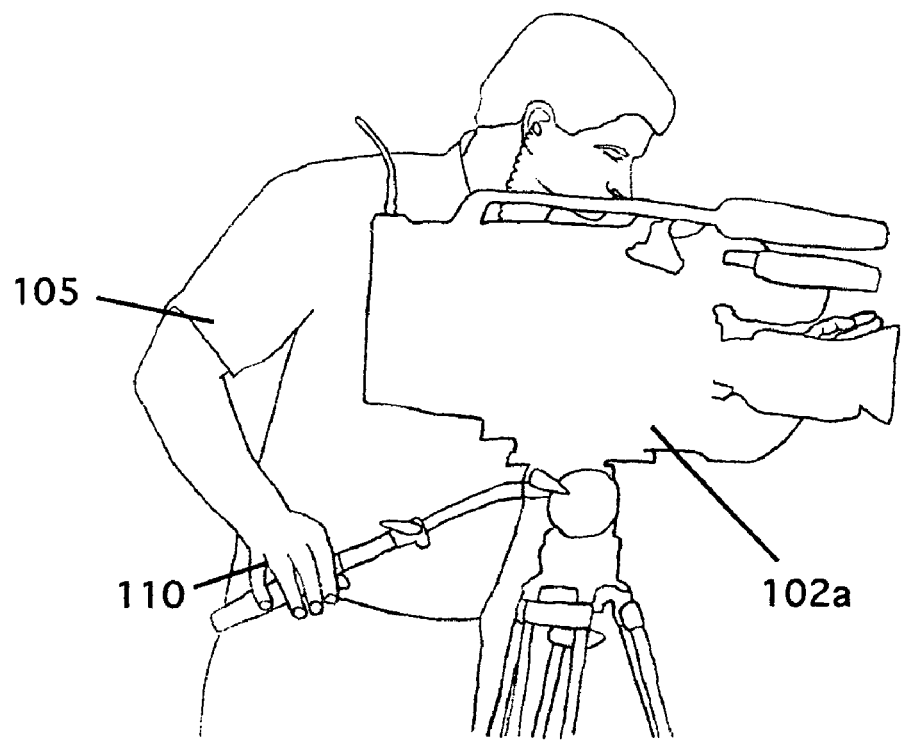
FIG. 1A is a side view of a person using their hands to control a professional camera as prior art.
Figure 1B:
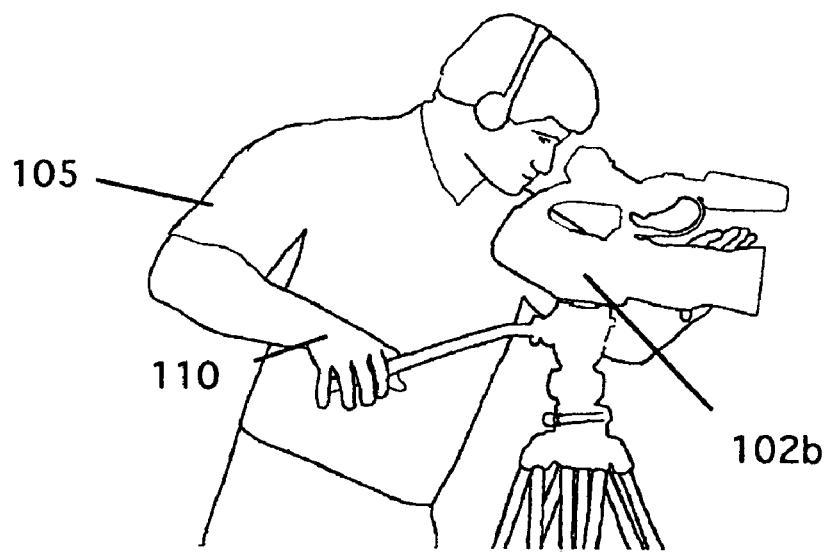
FIG. 1B is a side view of a person using their hands to control a semi-professional camera as prior art.
Figure 1C:
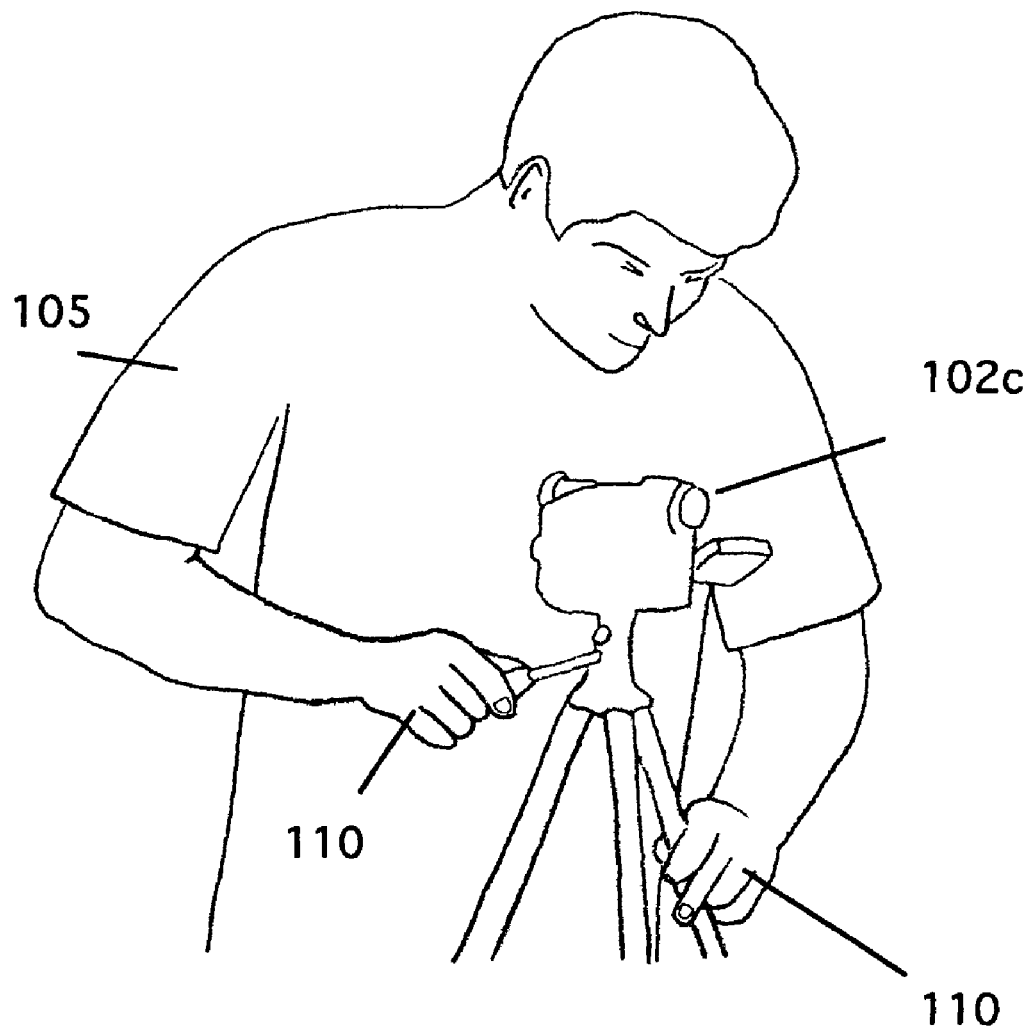
FIG. 1C is a side view of a person using their hands to control an amateur camera as prior art.
Figure 1D:
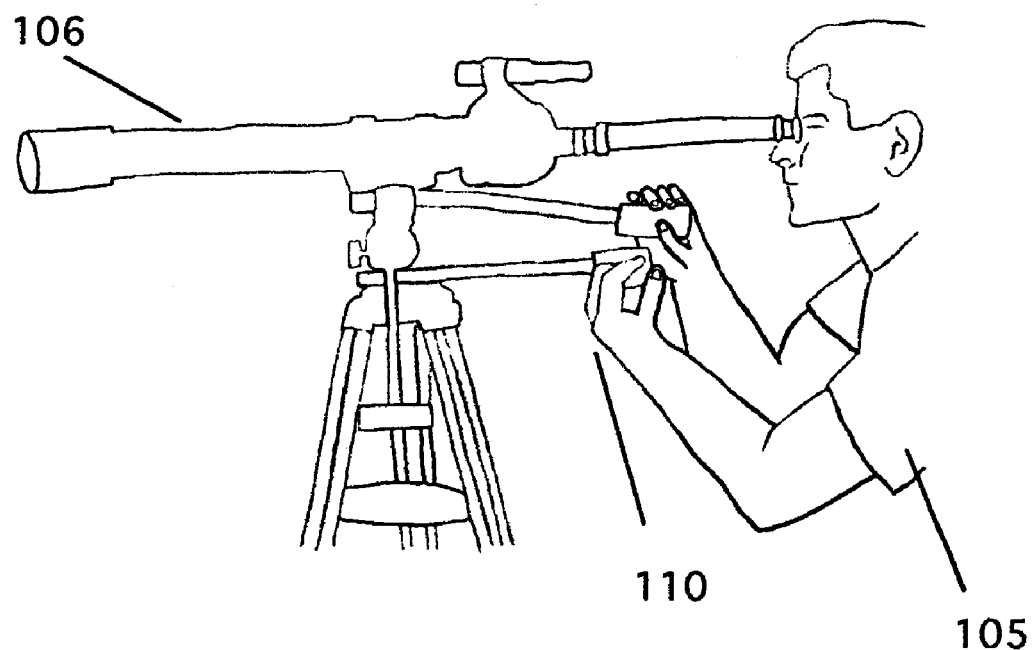
FIG. 1D is a side view of a person using their hands to control a telescope as prior art.
Figure 2A:
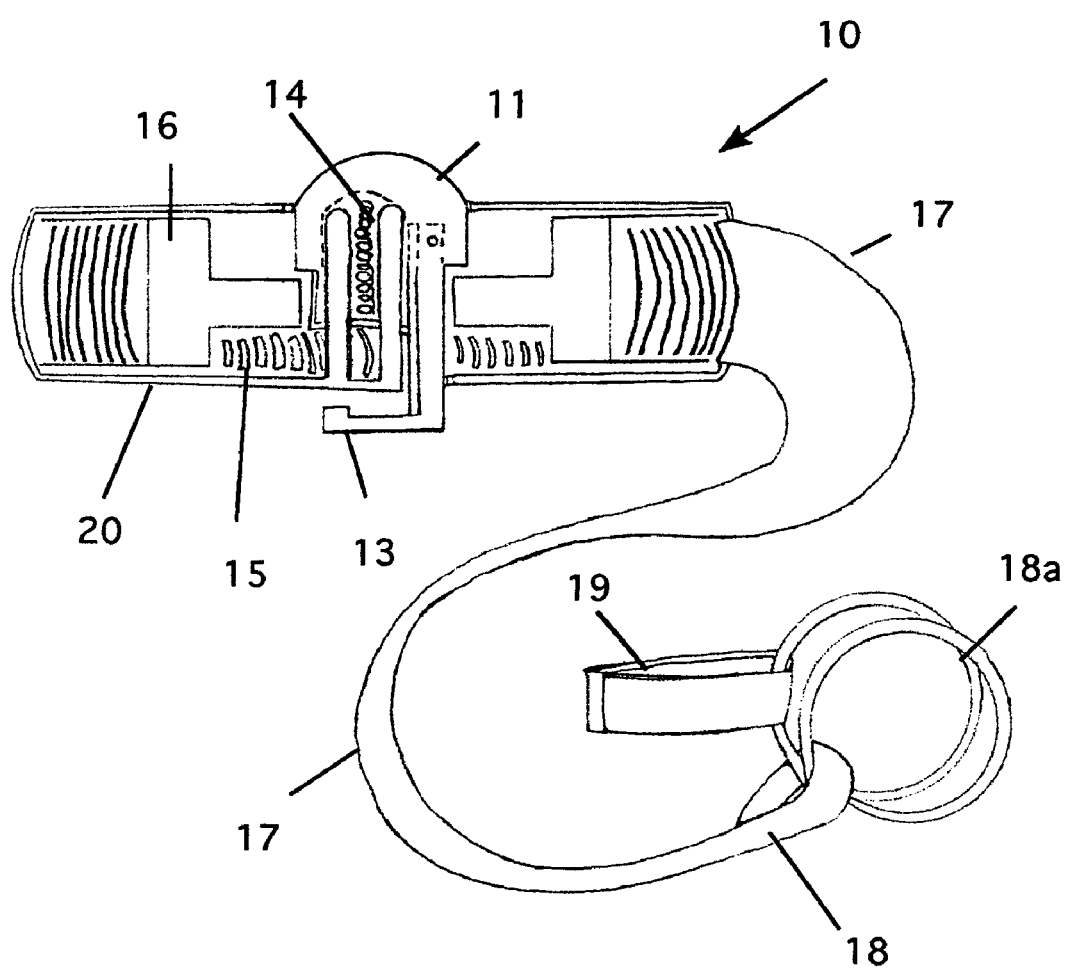
FIG. 2a is a cross-sectional side view of the invention with the lock open.

Referring to FIG. 2a illustrated is a sectional view of the device 10, comprised of a main case handgrip 20, that houses a flat spring 15, and that is connected to a winding drum 16, which the elastic tape 17, is wound thereon. FIG. 2a further illustrates the device with the lock 13, open and ready to receive the elastic tape that is extended through an opening of the main case handgrip. Note that the lock 13 can be described as an extendible flange. Here, the push button 11 is shown compressed with the inner spring 14, creating the tension on the push button.

Figure 2B:
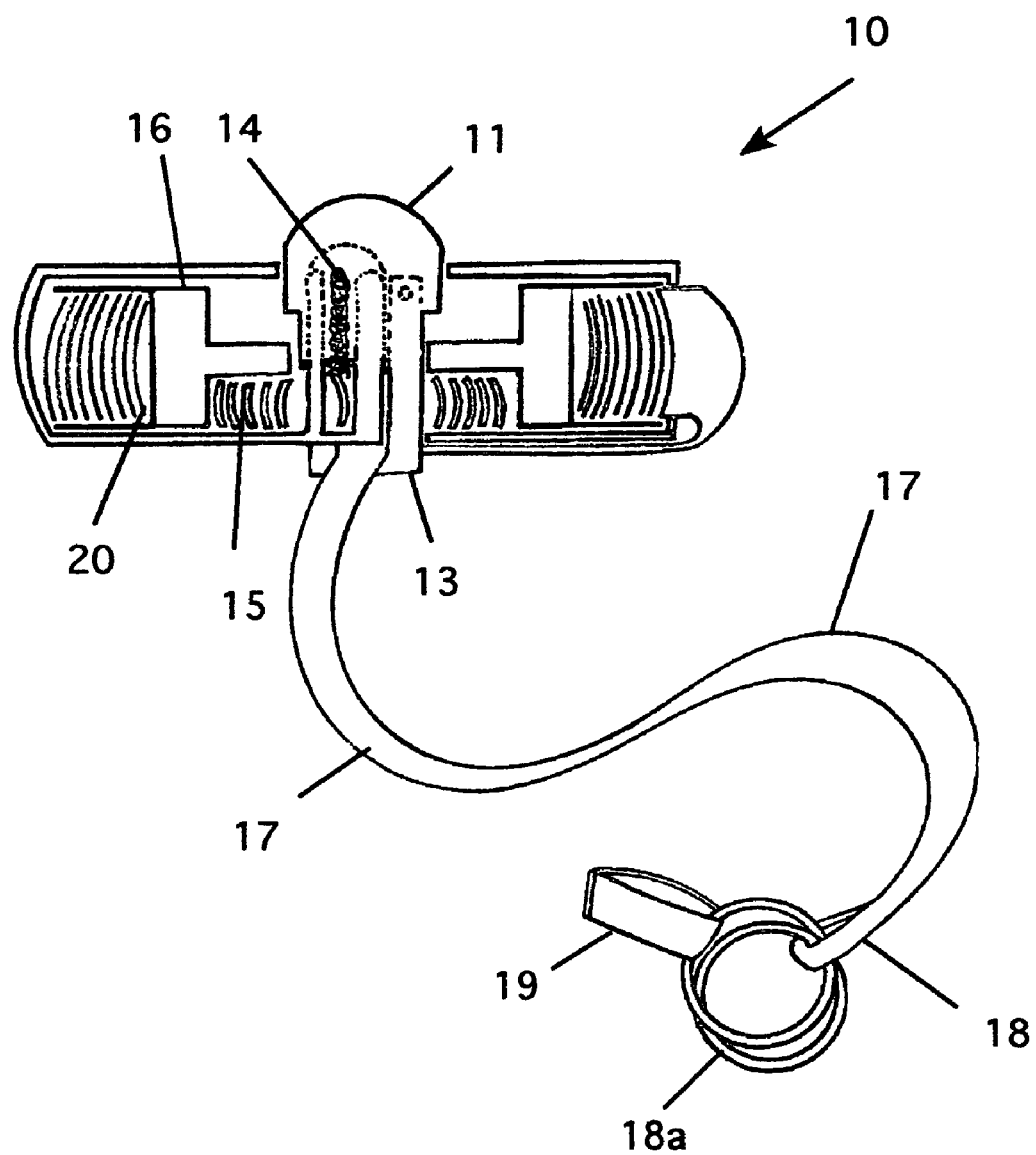
FIG. 2b is a cross-sectional side view of the invention with the lock closed.

Referring to FIG. 2b illustrated is a sectional view of the instrument leash device 10, comprised of a main case handgrip 20, that houses a flat spring 15, and that is connected to a winding drum 16, which the elastic tape 17, is wound thereon. FIG. 2b further illustrates the instrument leash device with the lock 13, closed around the elastic tape that is extended through an opening of the main case handgrip 20. The push button 11 is shown released, with the inner spring 14 creating the tension on the locking mechanism 13.

Figure 3:
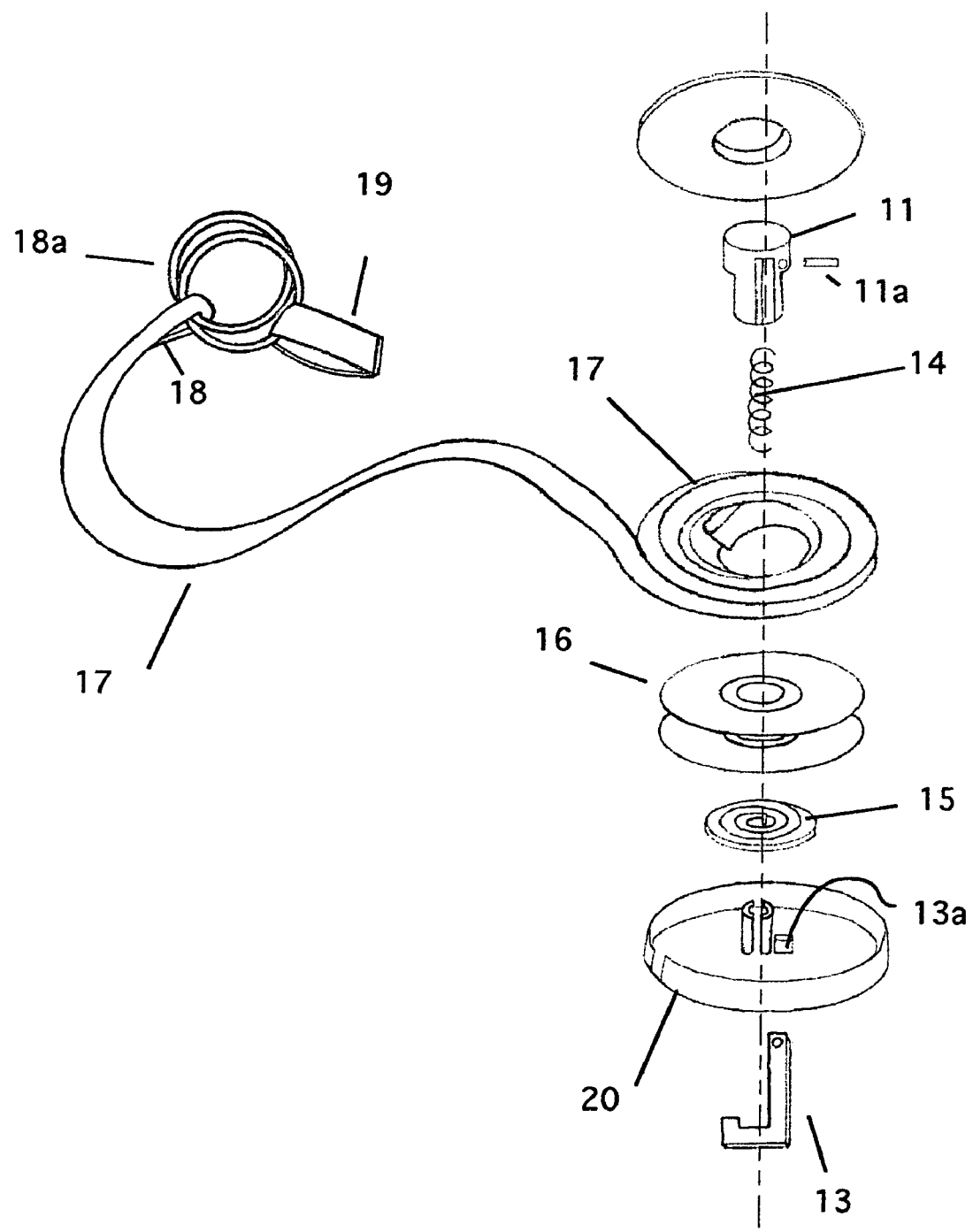
FIG. 3 is an exploded view of the invention.

FIG. 3 illustrated is an exploded view of the instrument leash device 10, with the locking main case handgrip 20, that houses a flat spring 15, and that is connected to a winding drum 16, which the elastic tape 17, is wound thereon. FIG. 3 further illustrates the instrument leash device with the lock 13 that is extended through an opening of the main case handgrip 20 through hole 13a, and the push button 11. Note that the pushbutton 11 is secured into the housing with a pin 11a. The lock 13 is also held in place with a pin. The compression spring 14 is positioned to fit inside the button 14 as shown.

The distal end of the elastic tape forms a tab 18 around annular cloth tabs 18*a* with a looped elastic cord 19, connected to the tabs as shown.

Figure 4A:
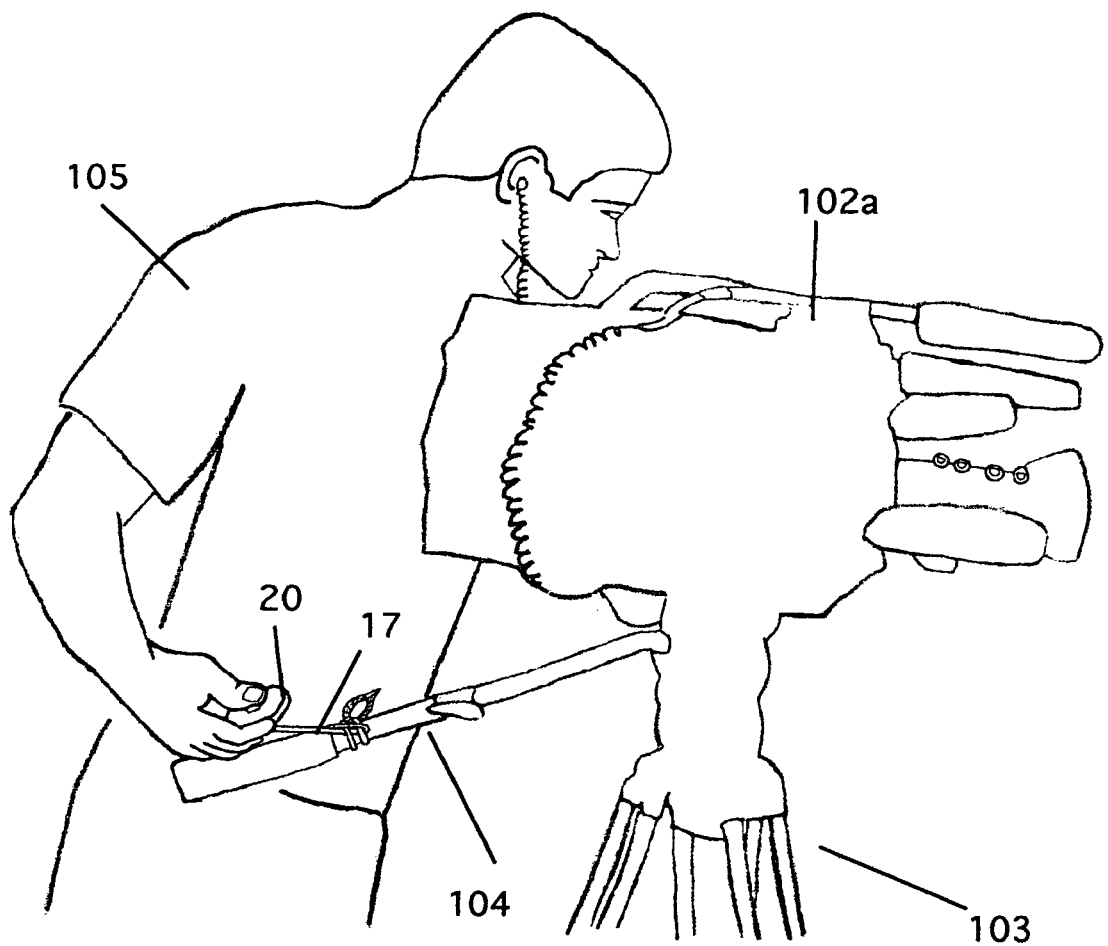
FIG. 4a is a side view of a person utilizing the invention on a professional camera using one hand to operate the invention.

FIG. 4*a* is a view of the device 10, being utilized by a person 105 to guide a camera 102*a*, without touching either the tripod 103, or the tripod's handle 104. The elastic tape 17 is wrapped around handle, to slow or stop the camera. The near end of the tape 17 is placed under the lock, as discussed above. The user can then push the button 11 to release a length of the elastic tape 17 from the device. The amount is dependent on the size and weight of the camera and the comfort of the individual operator. When an adequate amount of the tape has been released, the user releases the button to lock the device. To move the camera, the operator pulls on the elastic tape. As the tape stretches, the camera moves gently, without jerking.

In this way, smooth movement of cameras and other precision instruments that are mounted on tripods can be obtained.

Figure 4B:
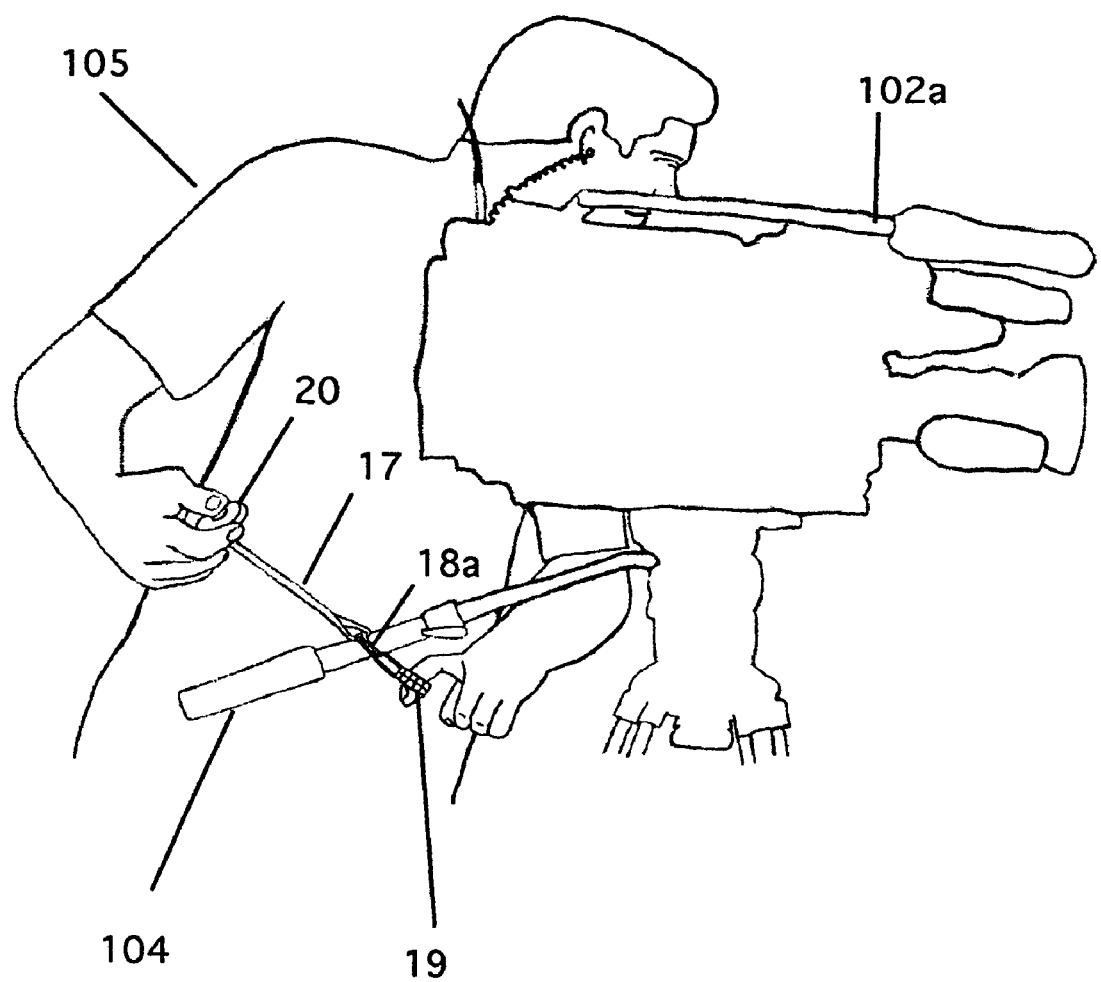
FIG. 4b is a detail view of a person utilizing the invention on a professional camera using two hands to operate the invention.

FIG. 4*b* is a side view of a person 105 utilizing the invention on a professional camera using two hands to operate the invention. In this mode, the operator holds the handgrip 20 in one hand, with his or her thumb on the button 11. The operator's other hand is aligned with the handle 104 as shown. The operator slides one finger through the looped elastic cord 19. In this way, the operator provides a counter force on the handle 104 to further smooth the movement of the camera.

Figure 4C:
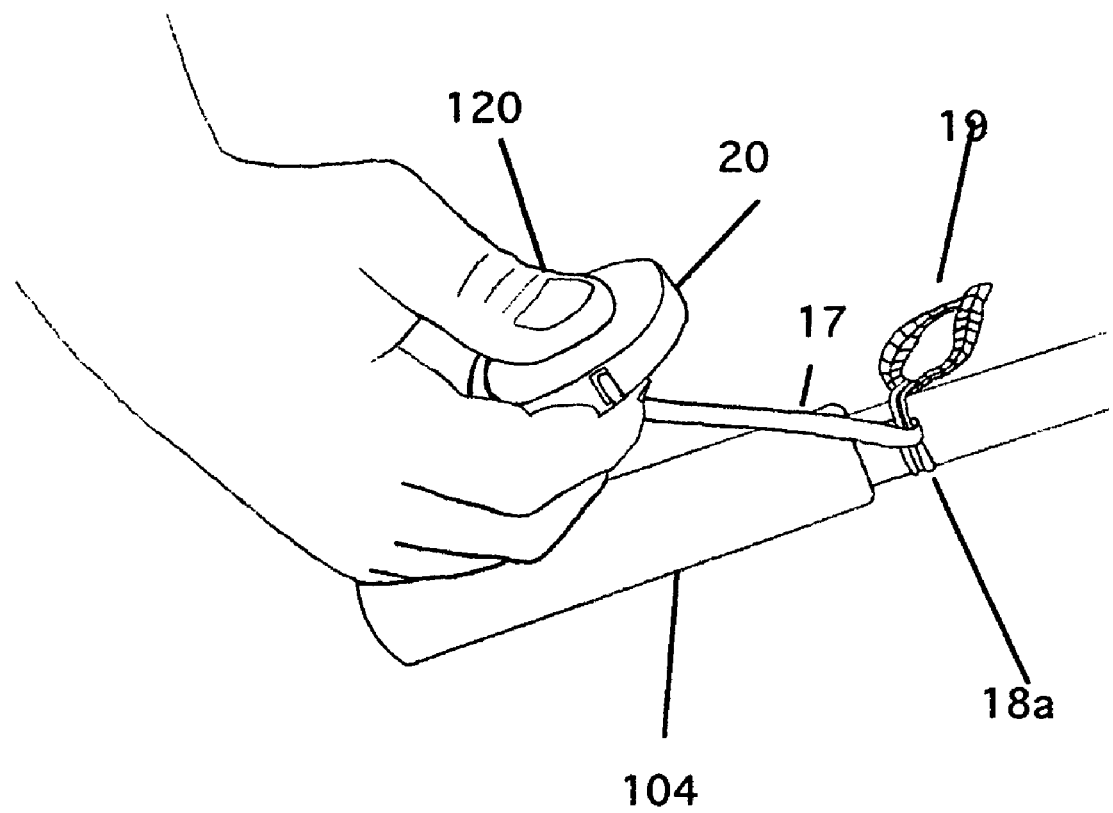
FIG. 4c is a close-up view of an operator holding the invention with one hand.

FIG. 4*c* is a close-up view of an operator holding the invention with one hand. In this view, the thumb 120 is clearly pressing the button 11 to release more of the elastic tape 17.

Figure 5A:
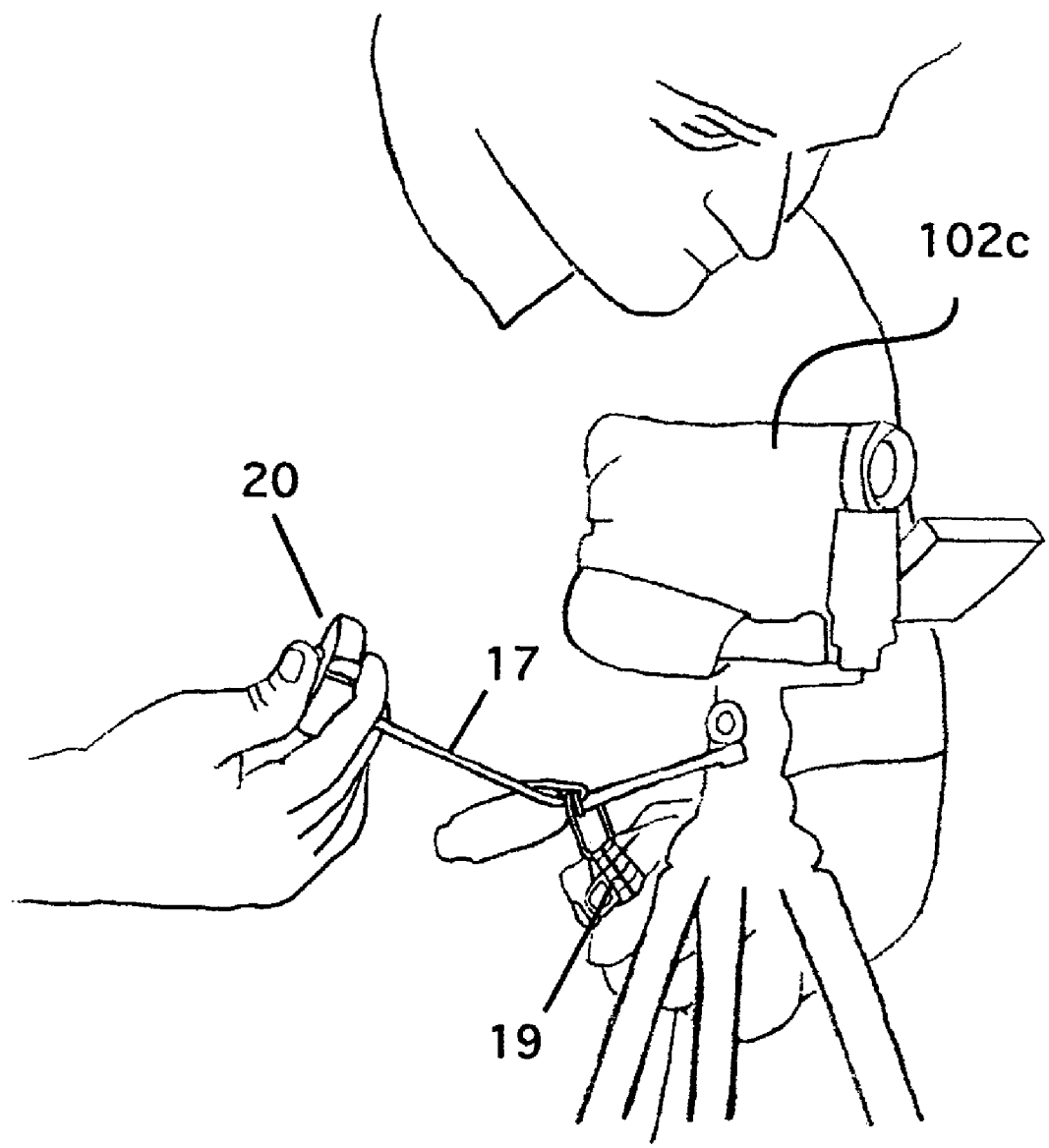
FIG. 5a is a side view of a person utilizing the invention on an amateur camera using two hands to operate the invention.

FIG. 5*a* is a side view of a person utilizing the invention on an amateur camera using two hands to operate the invention. Here, the operator needs less force to control the camera. Thus, less of the elastic tape 17 is removed to move the camera. As before, the second hand is used to further steady the camera.

Figure 5B:
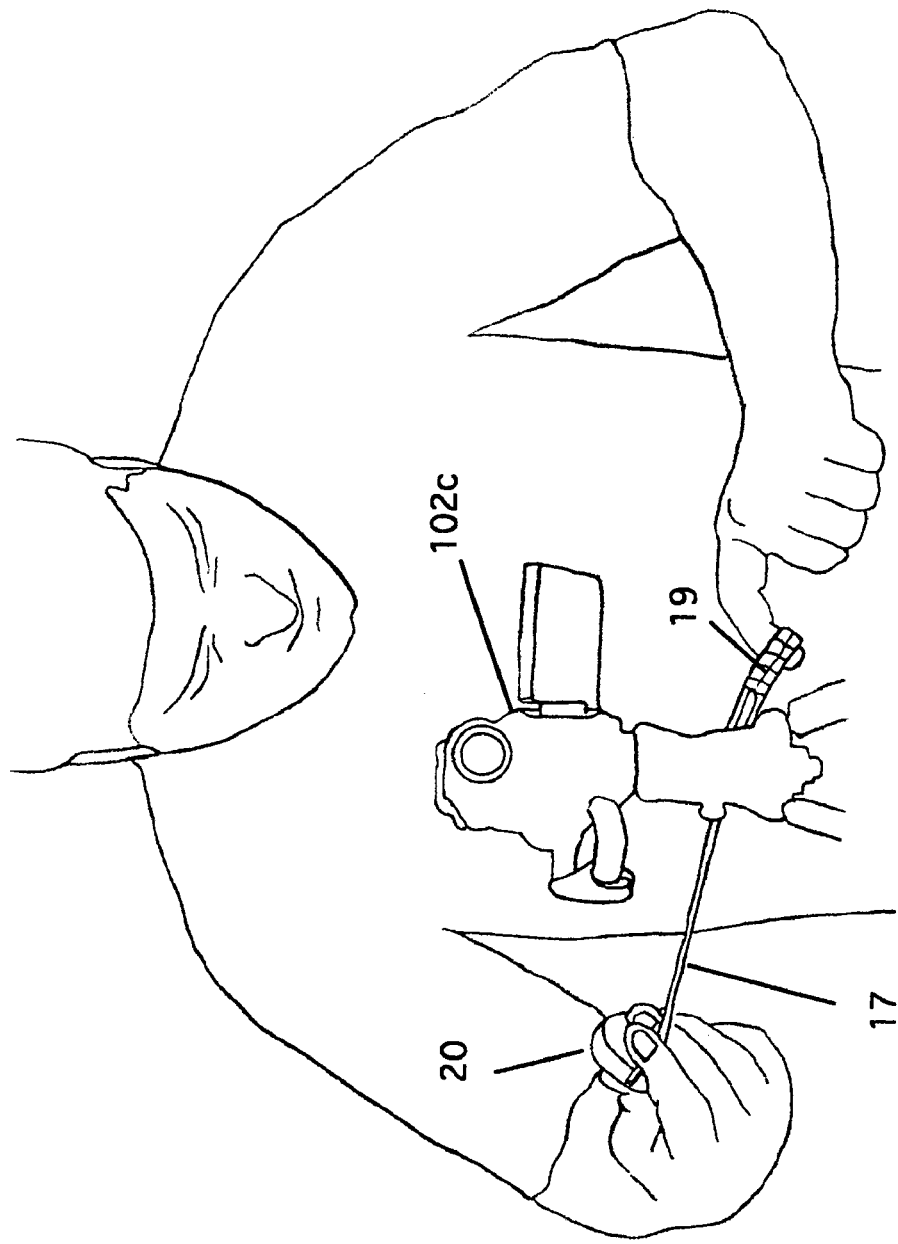
FIG. 5b is a front view of a person utilizing the invention on an amateur camera using two hands to operate the invention.

FIG. 5*b* is a front view of a person utilizing the invention on an amateur camera using two hands to operate the invention. Here, the direction of pull is clearly shown as well.

Figure 6A:
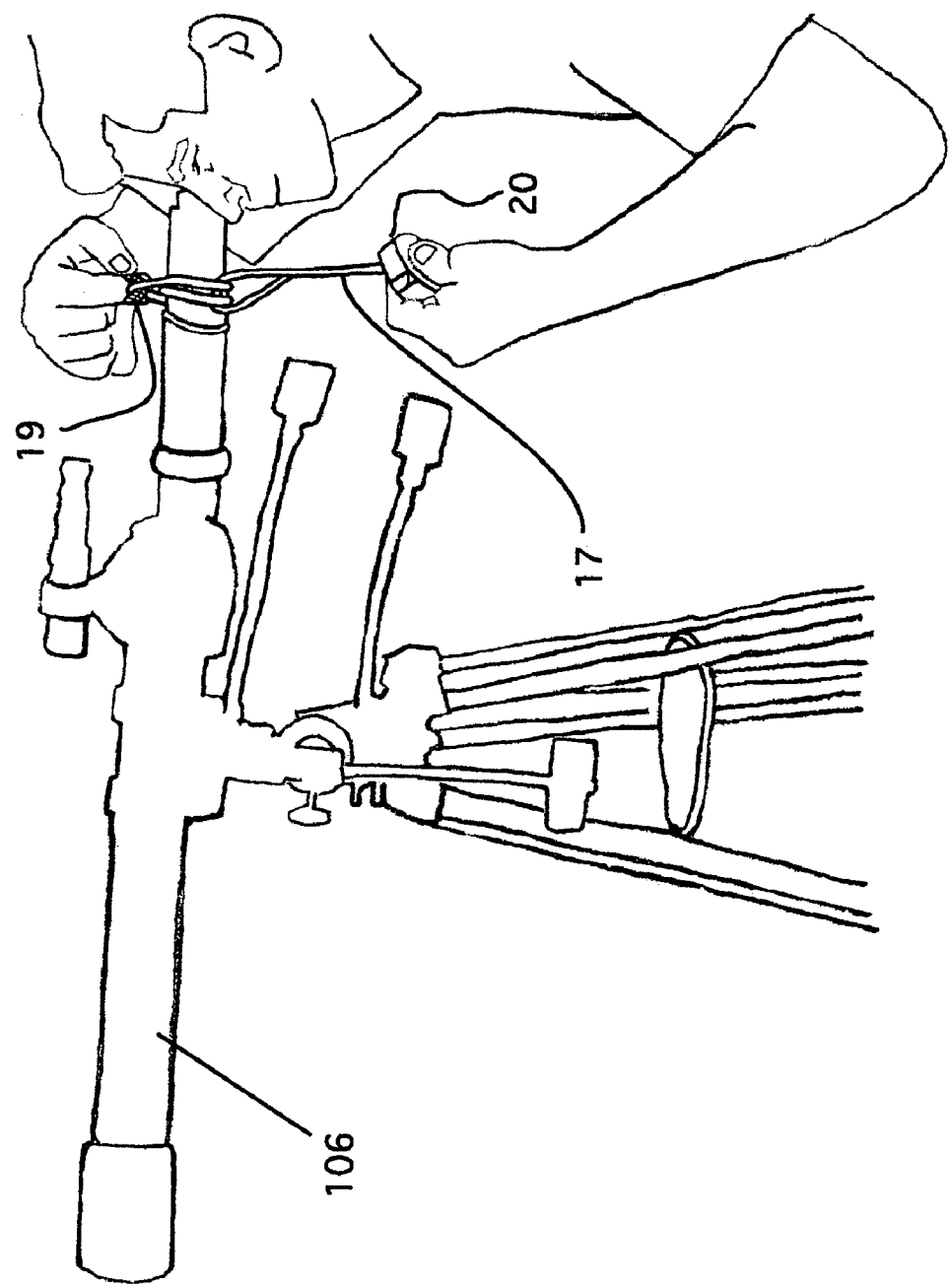
FIG. 6a is a side view of a person utilizing the invention on a telescope using two hands to operate the invention.

FIG. 6*a* is a side view of a person utilizing the invention on a telescope using two hands to operate the invention. As discussed above, the tool can be used to steady other instruments as well as cameras. Here the device is used to steady the movement of a telescope 106

Figure 6B:
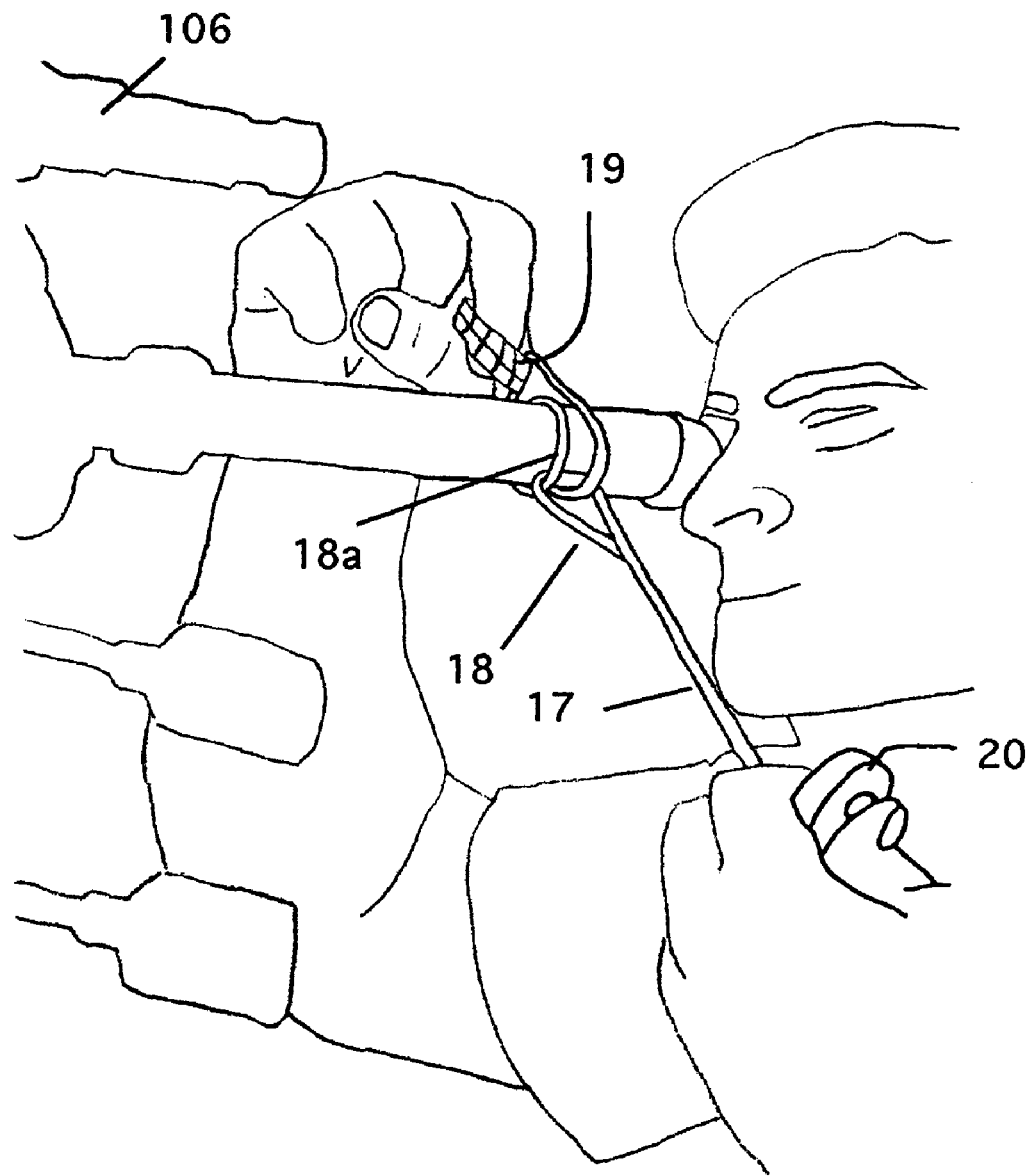
FIG. 6b is a close-up view of a person utilizing the invention on a telescope using two hands to operate the invention.

FIG. 6*b* is a close-up view of a person utilizing the invention on a telescope using two hands to operate the invention. Here, the cloth tabs 18*a* are clearly shown positioned on the telescope eyepiece shaft. They are attached to tripod handles in the exact same manner. The tape 17 and the looped elastic cord 19 are used as discussed above.

As discussed above, the length of the elastic tape is adjusted for the size and weight of the instrument. When a much lighter camera is used, the length of elastic tape removed from the drum is smaller. Moreover, for lighter instruments, a narrower tape can be used. Thus, the width of the tape is sized to match the equipment being controlled. For example, for small sized said precision instruments that are up to six pounds in weight the tape width is preferably about 0.125 inch. The resilient cord is preferably about 0.0781 inch. For medium sized precision instruments that are five to fifteen pounds in weight, the tape width is preferably about 0.2188 inch and the width of resilient cord is preferably about 0.0938 inch. For large sized precision instruments that are twelve to twenty pounds in weight, the tape width is preferably about 0.3438 inch and the width of resilient cord is preferably about 0.1094 inch or larger sized width of said resilient cord. For larger sized said precision instruments that are more than twenty pounds the tape width is preferably about 0.5 inch and the width of resilient cord is preferably about 0.125 inch.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of reducing vibration in the fine movement of a precision instrument secured to a tripod, by using a device having a main case, having a perimeter wall, said perimeter wall having an opening therein; a winding drum, installed inside said main case, said winding drum being rotatable in said main case; a length of resilient tape having a proximate end, a distal end and a width, the proximate end being secured to said winding drum; a resilient cord, having a width, attached to the distal end of said resilient tape; a cloth tab secured to said resilient cord; and a means for locking said winding drum, installed in said main case to temporarily prevent said winding drum from rotating comprising the steps of:
 a) extending a length of resilient tape from said main housing;
 b) securing said resilient tape to a tripod handle;
 c) using said resilient tape to rotate an instrument on said tripod by pulling on said resilient tape.

2. The method of claim 1 wherein the resilient cord extends in an opposite direction from said resilient tape when said resilient tape is secured to a tripod handle.

3. The method of claim 2 further comprising the step of:
 a) during step c, using said doth tab on said resilient cord to pull said tripod handle in an opposite direction to that of the movement caused by pulling on said resilient tape, thereby creating a counter force; said counter force being used to further stabilize movement of said instrument.

4. The method of claim 1 wherein the instrument is selected from the group of: camera, video camera, and telescope.

5. The method of claim 1 wherein the means for locking said winding drum includes an extendible flange.

6. The method of claim 5 further comprising the step of:
 a) after step a, opening said lock by extending said extendible flange;
 b) placing a portion of the resilient tape onto said extendible flange; and
 c) retracting said extendable flange, until said extendable flange is in a locked position, whereby said portion of the resilient tap is secured within said extendable flange.

7. The method of claim 6 wherein the means for locking said winding drum includes a push button in operable communication with said extendable flange.

8. The method of claim 7 wherein the step of opening said lock includes the step of pressing on said push button.

9. The method of claim 7 wherein the step of retracting said extendable flange includes the step of releasing said push button.

\* \* \* \* \*